United States Patent
Hsieh et al.

(10) Patent No.: US 7,831,860 B2
(45) Date of Patent: Nov. 9, 2010

(54) SYSTEM AND METHOD FOR TESTING REDUNDANCY AND HOT-SWAPPING CAPABILITY OF A REDUNDANT POWER SUPPLY

(75) Inventors: Chung-Jen Hsieh, Taipei Hsien (TW); Chao-Tsung Fan, Taipei Hsien (TW); Chien-Min Fang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 374 days.

(21) Appl. No.: 12/168,862

(22) Filed: Jul. 7, 2008

(65) Prior Publication Data
US 2009/0049337 A1 Feb. 19, 2009

(30) Foreign Application Priority Data
Aug. 17, 2007 (CN) .......................... 2007 1 0201387

(51) Int. Cl.
*G06F 11/00* (2006.01)
(52) U.S. Cl. .............................. 714/14; 714/22; 324/771
(58) Field of Classification Search ...................... 714/1, 714/224; 324/771
See application file for complete search history.

(56) References Cited

U.S. PATENT DOCUMENTS

| | | | | |
|---|---|---|---|---|
| 4,528,458 A | * | 7/1985 | Nelson et al. ................. | 307/64 |
| 5,834,856 A | * | 11/1998 | Tavallaei et al. .............. | 307/64 |
| 6,055,647 A | * | 4/2000 | Lacombe et al. .............. | 714/14 |
| 2002/0007468 A1 | * | 1/2002 | Kampe et al. .................. | 714/4 |
| 2002/0124128 A1 | * | 9/2002 | Qiu ............................. | 710/302 |
| 2002/0161924 A1 | * | 10/2002 | Perrin et al. ................. | 709/240 |
| 2003/0110245 A1 | * | 6/2003 | Sanders et al. .............. | 709/223 |
| 2005/0046440 A1 | * | 3/2005 | Phillips ....................... | 324/771 |
| 2006/0072262 A1 | * | 4/2006 | Paik et al. ..................... | 361/62 |
| 2008/0314168 A1 | * | 12/2008 | Zhang et al. ............... | 73/865.6 |

* cited by examiner

*Primary Examiner*—Scott T. Baderman
*Assistant Examiner*—Loan L. T. Truong
(74) *Attorney, Agent, or Firm*—Frank R. Niranjan

(57) ABSTRACT

A system for testing redundancy and hot-swapping capability of a redundant power supply includes a power switch fixture, a system under test (SUT), and a computing device. The power switch fixture includes a processor, an alternating current (AC) source, a first relay, a second, and two AC outputs. The processor is configured for controlling the AC source to output voltage to the two AC outputs by switching one of the first and the second relay on and the first and the second relay off, so as to ensure that one of the first power supply and the second power supply is operable to provide power to the SUT. The SUT includes a redundant power supply that includes a first power supply and a second power supply. The computing device includes a test control unit for testing redundancy and hot-swapping capability of the redundant power supply.

17 Claims, 3 Drawing Sheets

SYSTEM AND METHOD FOR TESTING REDUNDANCY AND HOT-SWAPPING CAPABILITY OF A REDUNDANT POWER SUPPLY

BACKGROUND

1. Field of the Invention

Embodiments of the present disclosure relate to the field of power supplies of electronic devices, and more particularly to a system and method for testing redundancy and hot-swapping capability of a redundant power supply.

2. Description of Related Art

To provide reliable service to system users, computers must be designed with a goal of minimum system downtime and maximum system availability. Because the failure of key components can lead to a loss of system availability, many key components, such as power supplies, are designed to provide redundant capacity. Thus the power supplies still provide normal operation of a computer system even in the event of a component failure. For example, a redundant power supply may include two separate power supplies, each capable of powering a computer system individually. Under normal operation, both power supplies are operable to share power load, with each power supply operable to provide half a required power of the computer system. However, in the event of failure or removal of one of the power supplies, the other power supply is operable to provide full power to the computer system.

To further minimize system downtime, key components in the computer system may be designed to be hot-swappable. Hot-swapping is a method for removing or replacing a component of the computer system without shutting down or restarting the computer system, thereby providing computer system availability even as the computer system is being serviced or repaired. In a computer system that provides hot-swappable redundant power supplies, one of the power supplies may be removed and serviced while the remaining power supply continues to power the computer system.

In order to ensure that the computer system is in a proper operation state, a manufacturer must manually test redundancy and hot-swap capability of a redundant power supply after the redundant power supply has been installed in the computer system. Such manual testing is inefficient and costly, and may not provide reliable results because of human errors.

What is needed, therefore, is a system and method for testing redundancy and hot-swapping capability of a redundant power supply, which can automatically switch power supplies to test the redundant capacity and hot-swap of the redundant power supply by utilizing a switch fixture instead of a manual test, so as to increase the test efficiency and improve the accuracy of the test results.

SUMMARY

In one aspect, a system for testing redundancy and hot-swapping capability of a redundant power supply in accordance with an exemplary embodiment is provided. The system includes a power switch fixture, a system under test (SUT), and a computing device. The power switch fixture includes a processor, an alternating current (AC) source, a first relay, a second relay, and two AC outputs. The power switch fixture is connected to the SUT by two power cables, and is connected to the computing device via a first serial port. The computing device is connected to the SUT via a second serial port. The SUT includes a redundant power supply that includes a first power supply and a second power supply for providing power for the SUT. The computing device includes a parameter setting module, a command generating module, a controlling module, a monitoring module, and a report generating module.

The parameter setting module is configured for setting a hot-swap iteration for switching the first power supply and the second power supply. The command generating module is configured for generating a plurality of commands comprising a hot-swap command, a control command, and a monitor command. The controlling module is configured for controlling the processor to switch the first power supply and the second power supply by switching one of the first and the second relay on and one of the first and the second relay off according to the hot-swap command, and controlling the computing device to test different operations of the SUT according to the control command. The monitoring module is configured for monitoring hot-swapping operations on the redundant power supply and working states of the SUT under different operations according to the monitor command. The report generating module is configured for generating a test report that indicates redundancy and hot-swapping capability of the redundant power supply according to the working states of the SUT.

In another aspect, a computer-implemented method for testing redundancy and hot-swapping capability of a redundant power supply is provided. The method includes: setting a first connection parameter for controlling a computing device to connect with a power switch fixture, and a second connection parameter for controlling the computing device to connect with a system under test (SUT), wherein the SUT comprises a redundant power supply comprising a first power supply and a second power supply; setting a hot-swap iteration for switching the first power supply and the second power supply; generating a plurality of commands that comprise a hot-swap command, a control command and a monitor command; switching the first power supply and the second power supply by utilizing of the power switch fixture according to the hot-swap command; controlling the computing device to test different operations of the SUT according to the control command while performing hot-swapping operations on the redundant power supply; monitoring the hot-swapping operations on the redundant power supply according to the monitor command; determining whether the redundant power supply switches successfully according to the hot-swapping operations; generating a test report that records a failure test result if the redundant power supply switches unsuccessfully; monitoring working states of the SUT under different operations on the SUT according to the monitor command if the redundant power supply switches successfully; determining whether the SUT is in a normal working condition according to the working states; determining the switch number of the hot-swap iteration completed so far is less than the hot-swap iteration if the SUT is in a normal working condition; and generating a test report for recording a successive test result that indicates redundancy and hot-swapping capability of the redundant power supply if the switch number is less than the hot-swap iteration.

In another aspect, a computer-readable medium having stored thereon instructions for testing redundancy and hot-swapping capability of a redundant power supply, the computer-readable medium, when executed by a computing device, causing the computing device to perform a method. The method comprises: setting a first connection parameter for controlling the computing device to connect with a power switch fixture, and a second connection parameter for controlling the computing device to connect with a system under test (SUT), wherein the power switch fixture comprises a processor, a first relay and a second relay, and the SUT comprises a redundant power supply comprising a first power supply and a second power supply; setting a hot-swap iteration for switching the first power supply and the second power supply; generating a plurality of commands comprising a hot-swap command, a control command, and a monitor command; controlling the processor to switch the first power supply and the second power supply by switching one of the first and the second relay on and one of the first and the second relay off according to the hot-swap command; controlling the computing device to test different operations of the SUT according to the control command while performing hot-swapping operations on the redundant power supply; monitoring the hot-swapping operations on the redundant power supply and working states of the SUT under different operations according to the monitor command; and generating a test report that indicates redundancy and hot-swapping capability of the redundant power supply according to the working states of the SUT.

Other advantages and novel features of the embodiments will be drawn from the following detailed description of certain inventive embodiments of the present disclosure with reference to the attached drawings, in which:

DETAILED DESCRIPTION OF CERTAIN INVENTIVE EMBODIMENTS

Figure 1:
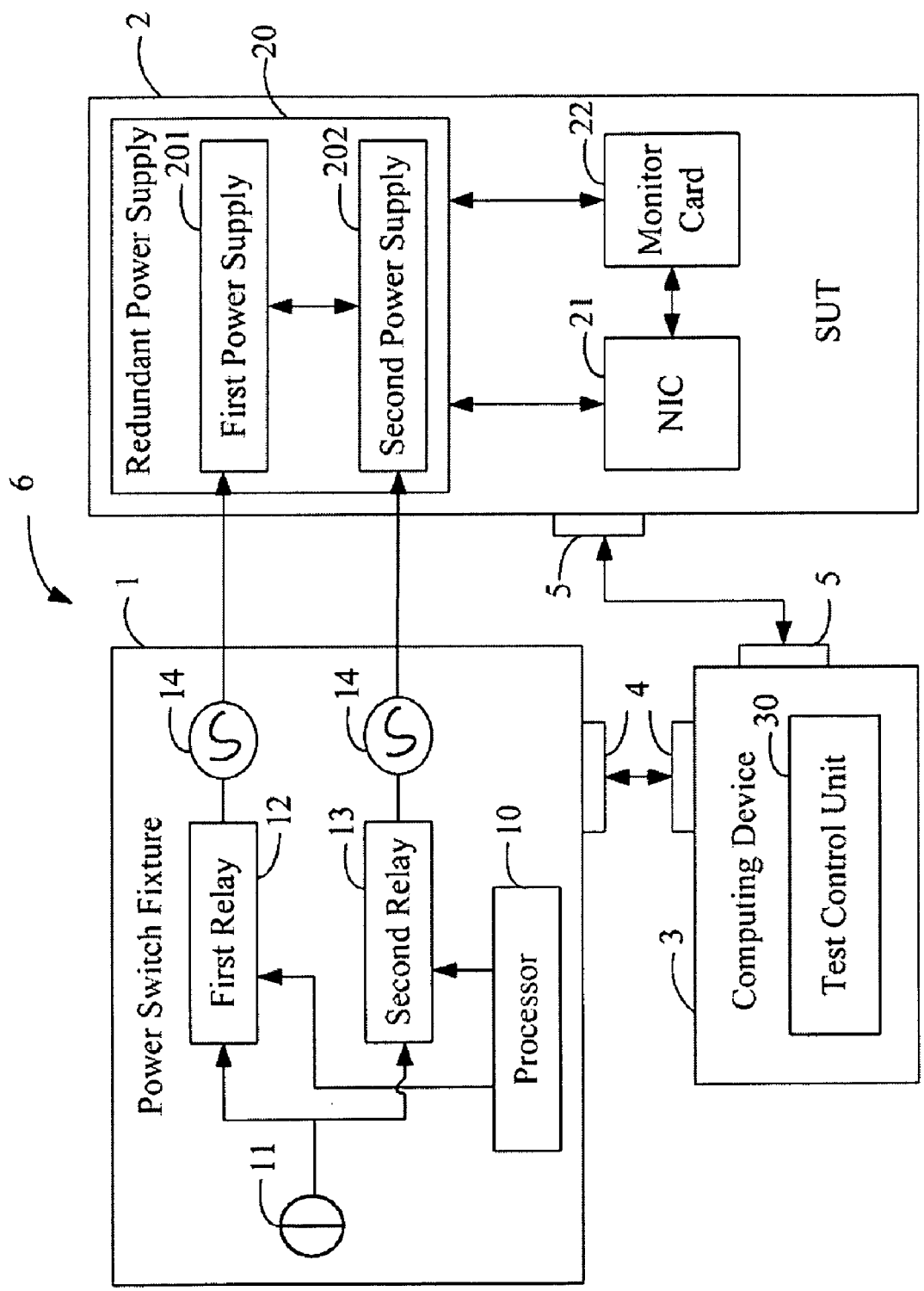
FIG. 1 is a schematic diagram of one embodiment of a system for testing redundancy and hot-swapping capability of a redundant power supply.

FIG. 1 is a schematic diagram of one embodiment of a system 6 for testing redundancy and hot-swapping capability of a redundant power supply 20. In one embodiment, the system 6 includes a power switch fixture 1, a system under test (SUT) 2, and a computing device 3. The power switch fixture 1 is connected to the SUT 2 by two power cables, and connects to the computing device 3 via a first serial port 4. The computing device 3 connects to the SUT 2 via a second serial port 5. Both the first serial port 4 and the second serial port 5 may be either a RS-232 port or a RJ-45 port.

In one embodiment, the power switch fixture 1 includes a processor 10, an alternating current (AC) source 11, a first relay 12, a second relay 13, two AC outputs 14. The processor 10 is electrically connected to the first relay 12 and the second relay 13, and is configured for controlling the AC source 11 to output voltage to the two AC outputs 14 by switching one of the first relay 12 and the second relay 13 on and one of the first relay 12 and the second relay 13 off.

The SUT 2 may include the redundant power supply 20, a network interface card (NIC) 21, and a monitor card 22. The redundant power supply 20 includes a first power supply 201 and a second power supply 202, and is configured for providing power to the SUT 2. The first power supply 201 and the second power supply 202 are respectively connected to the two AC outputs 14 of the power switch fixture 1. In one embodiment, the NIC 21 may be a BCM-5722 type of interface, or any other suitable functional units having communication functions. The NIC 21 is configured for receiving commands from the computing device 3, and transmitting working states of the SUT 2 to the computing device 3. The monitor card 22 is connected to the NIC 21, and is configured for monitoring hot-swap operations on the redundant power supply 20 during a switching between the first power supply 201 and the second power supply 202. The monitor card 22 is further configured for monitoring the working states of the SUT 2 under different test operations. In one embodiment, the monitor card 22 may be a H8S-2166 type of microprocessor or any other suitable functional units having monitor functions.

The computing device 3 includes a test control unit 30. The test control unit 30 is configured for setting a plurality of connection parameters for connecting the computing device 3 to the power switch fixture 1 and connecting the computing device 3 to the SUT 2, and a hot-swap iteration (i.e., 10 times) for the redundant power supply 20. The test control unit 30 is further configured for generating a plurality of commands including a hot-swap command, a control command, and a monitor command. Moreover, the test control unit 30 is configured for switching the first power supply 201 and the second power supply 202 according to the hot-swap command. The test control unit 30 is also configured for controlling the computing device 3 to test different operations of the SUT 2 according to the control command while performing the hot-swapping operations on the redundant power supply 20, and configured for monitoring the working states of the SUT 2 under the different operations according to the monitor command. Additionally, the test control unit 30 is configured for generating a test report that indicates redundancy and hot-swap capability of the redundant power supply 20 according to the working states of the SUT 2. The hot-swap command generated by the computing device 3 is transmitted to the processor 10 of the power switch fixture 1 via the first serial port 4. The control command is a test instruction for testing components of the SUT 2 that may include a memory, CPU, and an operating system (OS), for example. The monitor command may be a standard instruction, such as an IPMI (intelligent platform management instruction). Both the control command and the monitor command generated by the computing device 3 are transmitted to the SUT 2 via the second serial port 5.

In one embodiment, in order to switch the first power supply 201 and the second power supply 202, the processor 10 executes a hot-swap command to control the AC source 11 to output voltage to the two AC outputs 14 by switching one of the first relay 12 and the second relay 13 on and one of the first relay 12 and the second relay 13 off. During the process of testing redundancy and hot-swap capability of the redundant power supply 20, the processor 10 switches on one of the relays (i.e., the first relay 12 or the second relay 13) to ensure that one of the power supplies (i.e., the first power supply 201 or the second power supply 202) of redundant power supply 20 is operable to provide the power to the SUT 2.

Figure 2:
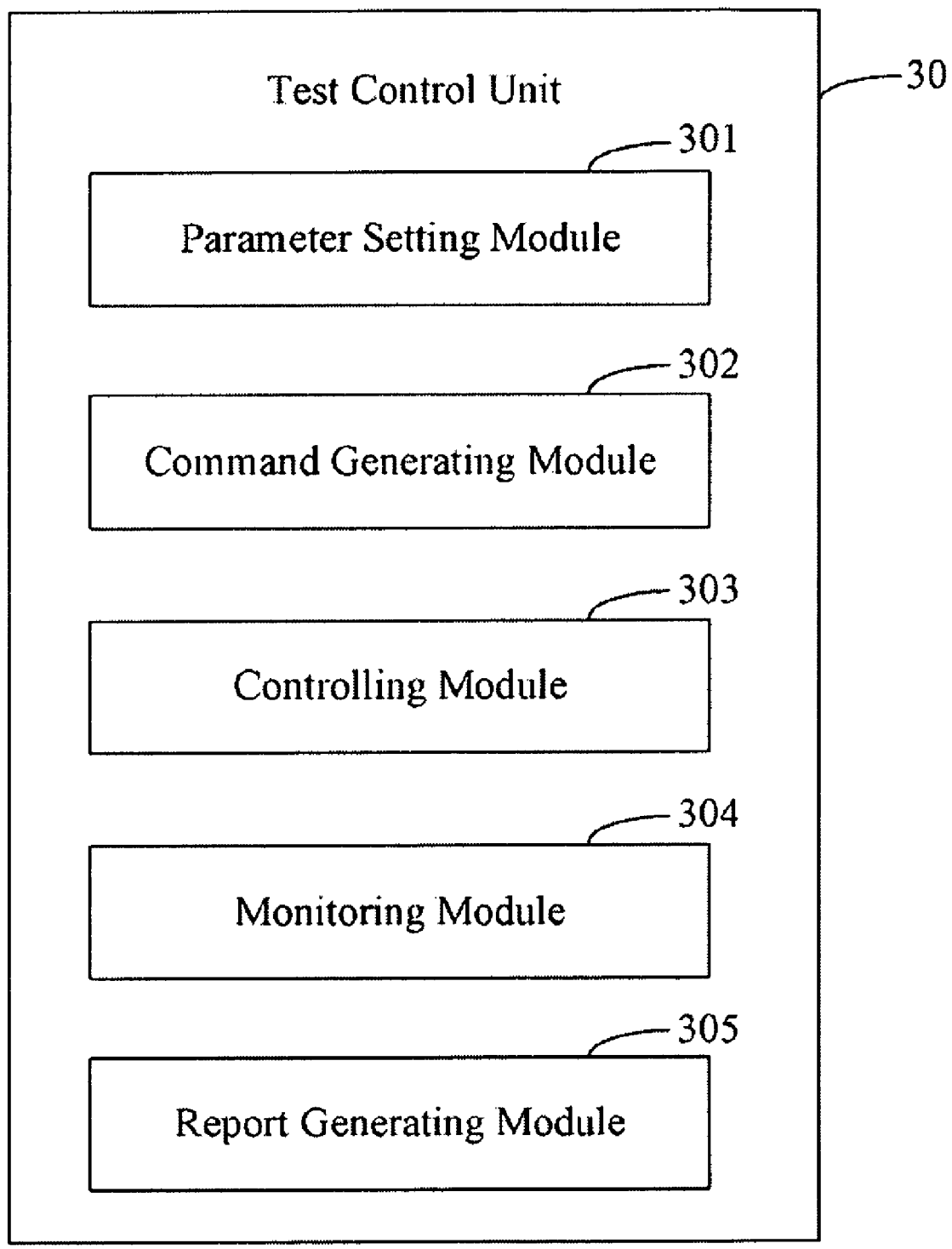
FIG. 2 is a schematic diagram of one embodiment of a test control unit of a computing device of FIG. 1.

FIG. 2 is a schematic diagram of one embodiment of the test control unit 30 of the computing device 3. In one embodiment, the test control unit 30 may be a software program including a plurality of instructions, and installed in a medium (e.g., hard disk, storage) of the computing device 3. The test control unit 30 includes a parameter setting module 301, a command generating module 302, a controlling module 303, a monitoring module 304, and a report generating module 305.

The parameter setting module 301 is configured for setting a plurality of connection parameters for connecting the computing device 3 to the power switch fixture 1 and connecting the computing device 3 to the SUT 2. The parameter setting module 301 is further configured for setting a hot-swap iteration (e.g., 10 times) for switching the first power supply 201 and the second power supply 202 of the redundant power supply 20.

The command generating module 302 is configured for generating a plurality of commands, such as the hot-swap command, the control command, and the monitor command. The command generating module 302 may transmit the hot-swap command to the processor 10 of the power switch fixture 1 via the first serial port 4, and transmit the control command and the monitor command to the SUT 2 via the second serial port 5.

The controlling module 303 is configured for controlling the processor 10 to switch the first power supply 201 and the second power supply 202 by switching one of the first relay 12 and the second relay 13 on and one of the first relay 12 and the second relay 13 off according to the hot-swap command. The controlling module 303 is further configured for controlling the computing device 3 to test different operations of the SUT 2 while performing hot-swapping operations on the first power supply 201 and the second power supply 202 according to the control command.

The monitoring module 304 is configured for monitoring the hot-swapping operations on the first power supply 201 and the second power supply 202, and the working states of the SUT 2 under different operations according to the monitor command. Then, the monitoring module 304 obtains the working states of the SUT 2 of the SUT 2.

The report generating module 305 is configured for generating a test report that indicates redundancy and hot-swap capability of the redundant power supply 20 according to the working states of the SUT 2. Further, the report generating module 305 may output the test report to a user for viewing on a display, and/or output the results to a printer (not shown) or other device connected to the computing device 30.

Figure 3:
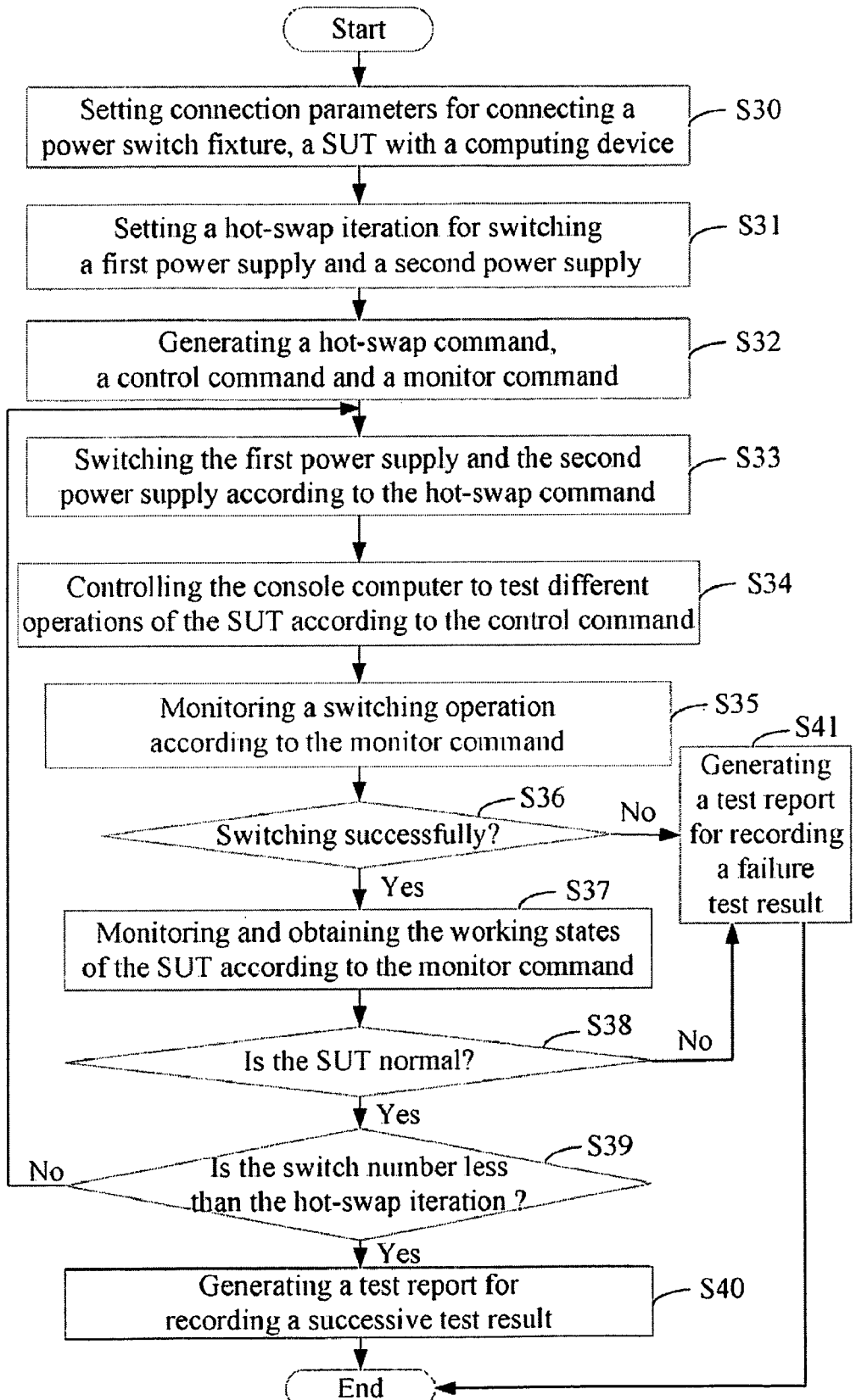
FIG. 3 is a flowchart of one embodiment of a method for testing redundancy and hot-swapping capability of a redundant power supply by implementing the system of FIG. 1.

FIG. 3 is a flowchart of one embodiment of a method for testing redundancy and hot-swapping capability of the redundant power supply 20 by implementing the system 6 as described above. In one example, a user connects the first power supply 201 and the second power supply 202 of the SUT 2 to the two AC outputs 14 of the power switch fixture 1 through two power cables. Then, the user connects the power switch fixture 1 to the computing device 3 via a first serial port 4, and connects the computing device 3 to the NIC 21 of the SUT 2 via a second serial port 5. The user powers on the power switch fixture 1 and turns on the computing device 3 to activate the test control unit 30 for performing the process of testing redundancy and hot-swapping capability of the redundant power supply 20.

In block S30, the parameter setting module 301 sets a first connection parameter for controlling the computing device 3 to connect with the power switch fixture 1, and sets a second connection parameter for controlling the computing device 3 to connect with the SUT 2.

In block S31, the parameter setting module 301 further sets a hot-swap iteration (e.g., 10 times) for switching the first power supply 201 and the second power supply 202 of the redundant power supply 20.

In block S32, the command generating module 302 generates a plurality of commands, such as a hot-swap command, a control command and a monitor command. Then, the command generating module 302 transmits the hot-swap command to the processor 10 of the power switch fixture 1 via the first serial port 4, and transmits the control command and the monitor command to the SUT 2 via the second serial port 5.

In block S33, the controlling module 303 controls the processor 10 to execute the hot-swap command for controlling the AC source 11 to output voltage via the two AC outputs 14 by switching one of the first relay 12 and the second relay 13 on and one of the first relay 12 and the second relay 13 off, so as to switch the first power supply 201 and the second power supply 202 of the redundant power supply 20 providing full power to the SUT 2.

In block S34, the controlling module 303 further controls the computing device 3 to test different operations of the SUT 2 according to the control command while performing the hot-swapping operations on the first power supply 201 and the second power supply 202. The different operations of the SUT 2 may include various kinds of testing operations, such as testing the memory, the CPU, and the OS of the SUT 2.

In block S35, the monitoring module 304 monitors the hot-swap operation on the first power supply 201 and the second power supply 202 of the redundant power supply 20 according to the monitor command.

In block S36, the monitoring module 304 determines whether the redundant power supply 20 switches successfully according to the hot-swapping operations. If the redundant power supply 20 switches unsuccessfully, in block S41, then the report generating module 305 generates a test report that reports failure.

Otherwise, if the redundant power supply 20 switches successfully, in block S37, then the monitoring module 304 monitors the working states of the SUT 2 under different operations on the SUT 2 according to the monitor command.

In block S38, the monitoring module 304 determines if the SUT 2 is in a normal working condition according to the working states of the SUT 2. If the SUT 2 is in an abnormal working condition, then the procedure goes to block S41 as described above.

Otherwise, if the SUT 2 is a normal working condition, in block S39, the monitoring module 304 further determines whether the number of hot-swap iterations completed so far is less than the hot-swap iterations set by the parameter setting module 301. If yes, the procedure returns to the above-described block S33.

Otherwise, the report generating module 305 generates a test report that reports success, and the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for testing redundancy and hot-swapping capability of a redundant power supply, the system comprising:
   a power switch fixture comprising a processor, an alternating current (AC) source, a first relay, a second relay, and two AC outputs;
   a system under test (SUT) comprising a redundant power supply that comprises a first power supply and a second power supply configured for providing power to the SUT; and
   a computing device comprising:
   a parameter setting module configured for setting a hot-swap iteration for switching the first power supply and the second power supply;
   a command generating module configured for generating a plurality of commands comprising a hot-swap command, a control command, and a monitor command;
   a controlling module configured for controlling the processor to switch the first power supply and the second power supply by switching one of the first and the second relay on and one of the first and the second relay off according to the hot-swap command, and controlling the computing device to test different operations of the SUT according to the control command;

a monitoring module configured for monitoring hot-swapping operations on the redundant power supply and working states of the SUT under different operations according to the monitor command; and a report generating module configured for generating a test report that indicates redundancy and hot-swapping capability of the redundant power supply according to the working states of the SUT.

2. The system according to claim 1, wherein the processor is configured for controlling the AC source to output voltage to the two AC outputs by switching one of the first and the second relay on and one of the first and the second relay off.

3. The system according to claim 1, wherein the parameter setting module is further configured for setting a first connection parameter for connecting the computing device with the power switch fixture, and a second connection parameter for connecting the computing device with the SUT.

4. The system according to claim 1, wherein the power switch fixture connects to the SUT through two power cables.

5. The system according to claim 1, wherein the power switch fixture connects to the computing device via a first serial port, and the computing device connects to the SUT via a second serial port.

6. The system according to claim 5, wherein each of the first port and the second port is one of a RS-232 port and a RJ-45 port.

7. The system according to claim 1, wherein the SUT further comprises a network interface card (NIC) and a monitor card.

8. The system according to claim 7, wherein the NIC is configured for receiving the control command and the monitor command from the computing device, and transmitting the working states of the SUT to the computing device.

9. The system according to claim 7, wherein the monitor card is connected to the NIC, and configured for monitoring the hot-swapping operations on the redundant power supply during switching between the first power supply and the second power supply, and monitoring the working states of the SUT under different test operations.

10. A computer-implemented method for testing redundancy and hot-swapping capability of a redundant power supply, the method comprising:

setting a first connection parameter for controlling a computing device to connect with a power switch fixture, and a second connection parameter for controlling the computing device to connect with a system under test (SUT), wherein the SUT comprises a redundant power supply comprising a first power supply and a second power supply;

setting a hot-swap iteration for switching the first power supply and the second power supply;

generating a plurality of commands that comprise a hot-swap command, a control command and a monitor command;

switching the first power supply and the second power supply by utilizing of the power switch fixture according to the hot-swap command;

controlling the computing device to test different operations of the SUT according to the control command while performing hot-swapping operations on the redundant power supply;

monitoring the hot-swapping operations on the redundant power supply according to the monitor command;

determining whether the redundant power supply switches successfully according to the hot-swapping operations;

generating a test report that records a failure test result if the redundant power supply switches unsuccessfully;

monitoring working states of the SUT under different operations on the SUT according to the monitor command if the redundant power supply switches successfully;

determining whether the SUT is in a normal working condition according to the working states;

determining the switch number of the hot-swap iteration completed so far is less than the hot-swap iteration if the SUT is in a normal working condition; and generating a test report for recording a successive test result that indicates redundancy and hot-swapping capability of the redundant power supply if the switch number is less than the hot-swap iteration.

11. The method according to claim 10, further comprising:
transmitting the hot-swap command to a processor of the power switch fixture via a first serial port; and
transmitting the control command and the monitor command to the SUT via a second serial port.

12. The method according to claim 11, wherein the processor controls that one of the first power supply and the second power supply is operable to provide power to the SUT during the process of testing redundancy and hot-swap of the redundant power supply.

13. The method according to claim 10, further comprising:
generating the test report that records the failure test result if the redundant power supply switches unsuccessfully.

14. The method according to claim 10, further comprising:
generating the test report that records the failure test result if the SUT is in an abnormal working condition.

15. A computer-readable medium having stored thereon instructions for testing redundancy and hot-swapping capability of a redundant power supply, the computer-readable medium, when executed by a computing device, causing the computing device to perform a method comprising:

setting a first connection parameter for controlling the computing device to connect with a power switch fixture, and a second connection parameter for controlling the computing device to connect with a system under test (SUT), wherein the power switch fixture comprises a processor, a first relay and a second relay, and the SUT comprises a redundant power supply comprising a first power supply and a second power supply;

setting a hot-swap iteration for switching the first power supply and the second power supply;

generating a plurality of commands comprising a hot-swap command, a control command, and a monitor command;

controlling the processor to switch the first power supply and the second power supply by switching one of the first and the second relay on and one of the first and the second relay off according to the hot-swap command;

controlling the computing device to test different operations of the SUT according to the control command while performing hot-swapping operations on the redundant power supply;

monitoring the hot-swapping operations on the redundant power supply and working states of the SUT under different operations according to the monitor command; and generating a test report that indicates redundancy and hot-swapping capability of the redundant power supply according to the working states of the SUT.

16. The medium according to claim 15, wherein the method further comprises:
- transmitting the hot-swap command to the processor via a first serial port; and
- transmitting the control command and the monitor command to the SUT via a second serial port.

17. The medium according to claim 15, wherein the processor controls one of the first power supply and the second power supply is operable to provide power to the SUT during the process of testing redundancy and hot-swap of the redundant power supply.

\* \* \* \* \*